United States Patent [19]

Nutter et al.

[11] Patent Number: 5,801,825
[45] Date of Patent: Sep. 1, 1998

[54] SOLDER REFLOW FURNACE HAVING A BOROSCOPE VIEWING ASSEMBLY

[75] Inventors: Francis C. Nutter, Methuen, Mass.; David A. Bloom, Hudson, N.H.

[73] Assignee: BTU International, Inc., North Billerica, Mass.

[21] Appl. No.: 637,486

[22] Filed: Apr. 24, 1996

[51] Int. Cl.⁶ .................................................. G01N 21/00
[52] U.S. Cl. .................................................. 356/241
[58] Field of Search .................. 356/241; 15/339, 15/414, 324, 415.1, 304; 359/363; 415/118

[56] References Cited

U.S. PATENT DOCUMENTS

| | | |
|---|---|---|
| 3,362,160 | 1/1968 | Bourgeois . |
| 3,690,775 | 9/1972 | Cousins .................................... 356/241 |
| 4,011,017 | 3/1977 | Feuerstein et al. ...................... 356/241 |
| 4,406,580 | 9/1983 | Baran, Jr. ................................. 415/118 |
| 4,679,425 | 7/1987 | Bolland .................................... 73/49.2 |
| 4,711,979 | 12/1987 | Glasser et al. ......................... 219/10.55 D |
| 4,826,317 | 5/1989 | Ellenrieder et al. ..................... 356/241 |
| 5,115,636 | 5/1992 | Zeiser ...................................... 60/39.33 |
| 5,423,481 | 6/1995 | Thomas .................................... 239/1 |
| 5,594,548 | 1/1997 | Kobayashi et al. ....................... 356/376 |

FOREIGN PATENT DOCUMENTS

| | | | |
|---|---|---|---|
| 1559185 | 1/1980 | United Kingdom ................... 356/241 |
| 2036363 | 3/1980 | United Kingdom ................... 356/241 |

*Primary Examiner*—Hoa Q. Pham
*Attorney, Agent, or Firm*—Weingarten, Schurgin, Gagnebin & Hayes LLP

[57] ABSTRACT

A boroscope viewing assembly allows viewing of the process chamber of a solder reflow furnace. A boroscope is removably supported within a cylindrical viewing port permanently mounted through the furnace housing. Coolant gas is flowable along the viewing port annularly surrounding the boroscope to cool the boroscope. The flow of coolant into the process chamber keeps flux vapors away from the boroscope. A sealing assembly seals the boroscope to the viewing port. The sealing assembly can be a gland fitting on the boroscope eyepiece or a compression sealing assembly. When the boroscope is removed, a plug can be placed in the end of the viewing port to seal the process chamber.

21 Claims, 4 Drawing Sheets

SOLDER REFLOW FURNACE HAVING A BOROSCOPE VIEWING ASSEMBLY

FIELD OF THE INVENTION

This invention relates to surface mount technology and more particularly to the solder reflow process in the surface mounting of components to a circuit board.

BACKGROUND OF THE INVENTION

In the surface mounting of components to circuit boards, circuit boards having preformed solder thereon are passed through a solder reflow convection furnace. Inside the furnace, the temperature is raised above the solder reflowing point, causing the solder to melt and flow. Upon cooling, the solder solidifies, thereby fastening the components to the board.

Since it occurs inside a furnace, the reflowing process, is the only part of a surface mount technology assembly line that is not readily viewable to the assembly line operators. Windows have been provided in the solder reflow furnaces. However, windows cause non-uniform heat loss and cloud up due to condensation of the flux vapors given off by the heated solder. Additionally, there is generally little available area on the solder reflow furnaces for placing windows. Also, it is difficult to adequately light the process chamber.

SUMMARY OF THE INVENTION

The present invention overcomes the difficulties of viewing the solder reflow process by providing one or more boroscopes removably supported within viewing ports located in the furnace housing. Each viewing port is formed of a cylindrical tube fastened within an opening in the furnace housing. The boroscope is supported concentrically inside the viewing port in annularly spaced relation to the interior of the viewing port. A coolant gas flowing along the annular space cools the boroscope below the melting temperature of the glue which retains the lenses in the boroscope. The flow of coolant exiting the viewing port in the process chamber keeps flux vapors away from the boroscope. A fiber optic light source is connected to the boroscope to light the process chamber.

In one embodiment, the boroscope includes a gland fitting on the eyepiece which seals the boroscope within the viewing port when the boroscope is inserted therein, but allows the boroscope to be readily removed from the viewing port. In another embodiment, a removable compression sealing assembly seals the boroscope to the viewing port. The end of the viewing port outside of the furnace can be sealed by a plug when the boroscope is removed.

The viewing port takes up little space and can be placed at many locations and angles to provide a suitable view of the process chamber. Typically, the viewing port is located to provide a side view of the circuit boards. Many types of boroscope can be fitted within the port. For example, a boroscope having a right angle viewing head can be used to view the boards from above.

The present device allows an operator to view the actual solder reflow process. The view can be seen directly through the boroscope eyepiece or can be transmitted to a monitor, which can be located at the furnace or at a remotely located central control area. Additionally, the view of the process chamber can be recorded on tape. With the present invention, an operator can monitor the process in the furnace and stop the process before significant damage occurs if a problem is observed. Electronics and process engineers can optimize the furnace design and the reflow process based on actual observations of the process.

DESCRIPTION OF THE DRAWING

The invention will be more fully understood from the following detailed description taken in conjunction with the accompanying drawings in which.

DETAILED DESCRIPTION OF THE INVENTION

Figure 1:
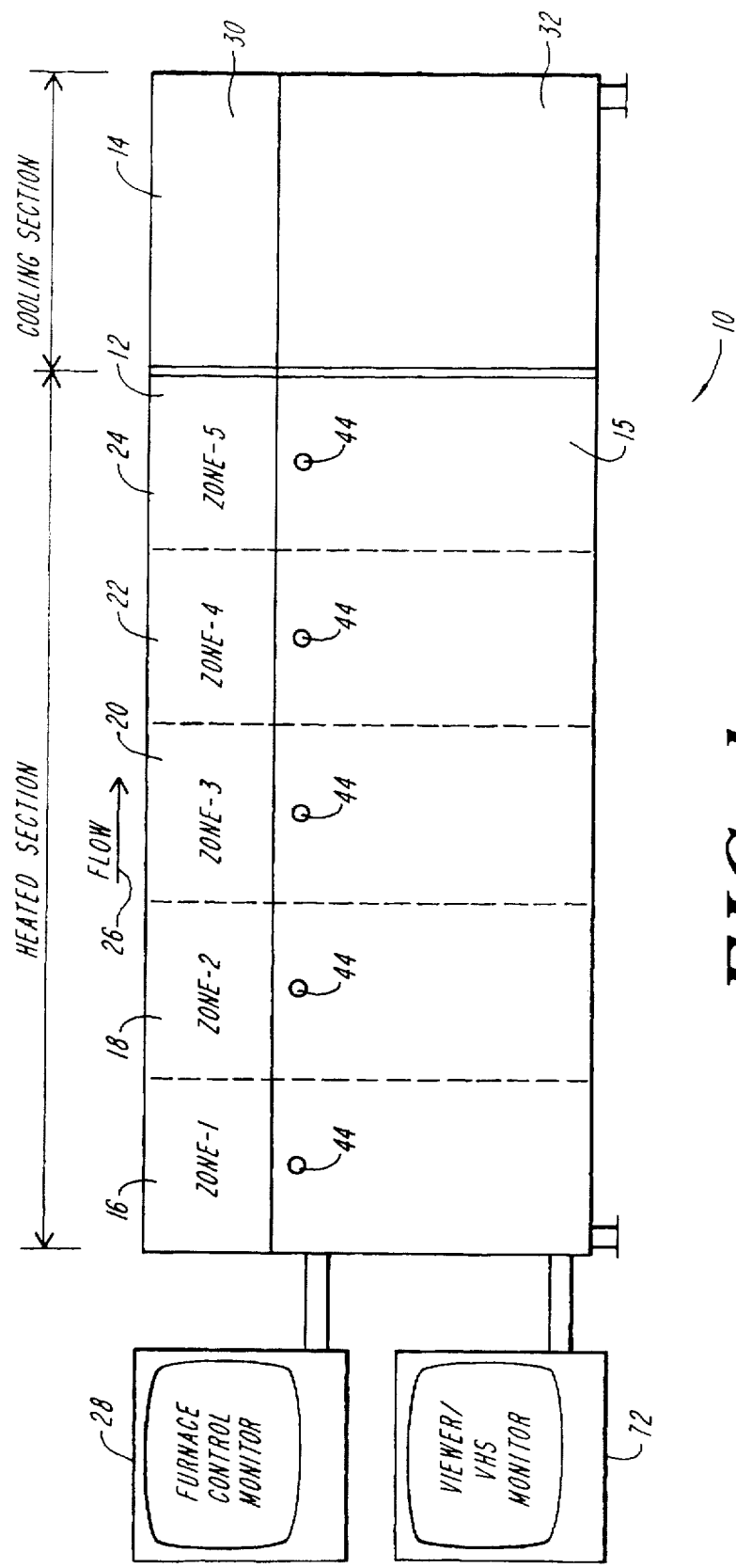
FIG. 1 is a schematic illustration of a solder reflow convection furnace embodying a boroscope viewing assembly according to the present invention.

A solder reflow convection furnace is illustrated generally at 10 in FIG. 1. The furnace typically comprises a heating section 12 and a cooling section 14 within a housing 15. The heating section is divided into a number of heating zones 16, 18, 20, 22, 24. Any suitable number of zones may be provided. A transport assembly (not shown) carries the product, circuit boards containing preformed reflowable solder, through the heating and cooling sections in the direction indicated by flow arrow 26. A furnace process controller 28, which includes a viewing monitor, is provided to control the temperature in each heating zone according to a predetermined temperature profile and allow an operator to monitor the process.

Figure 2:
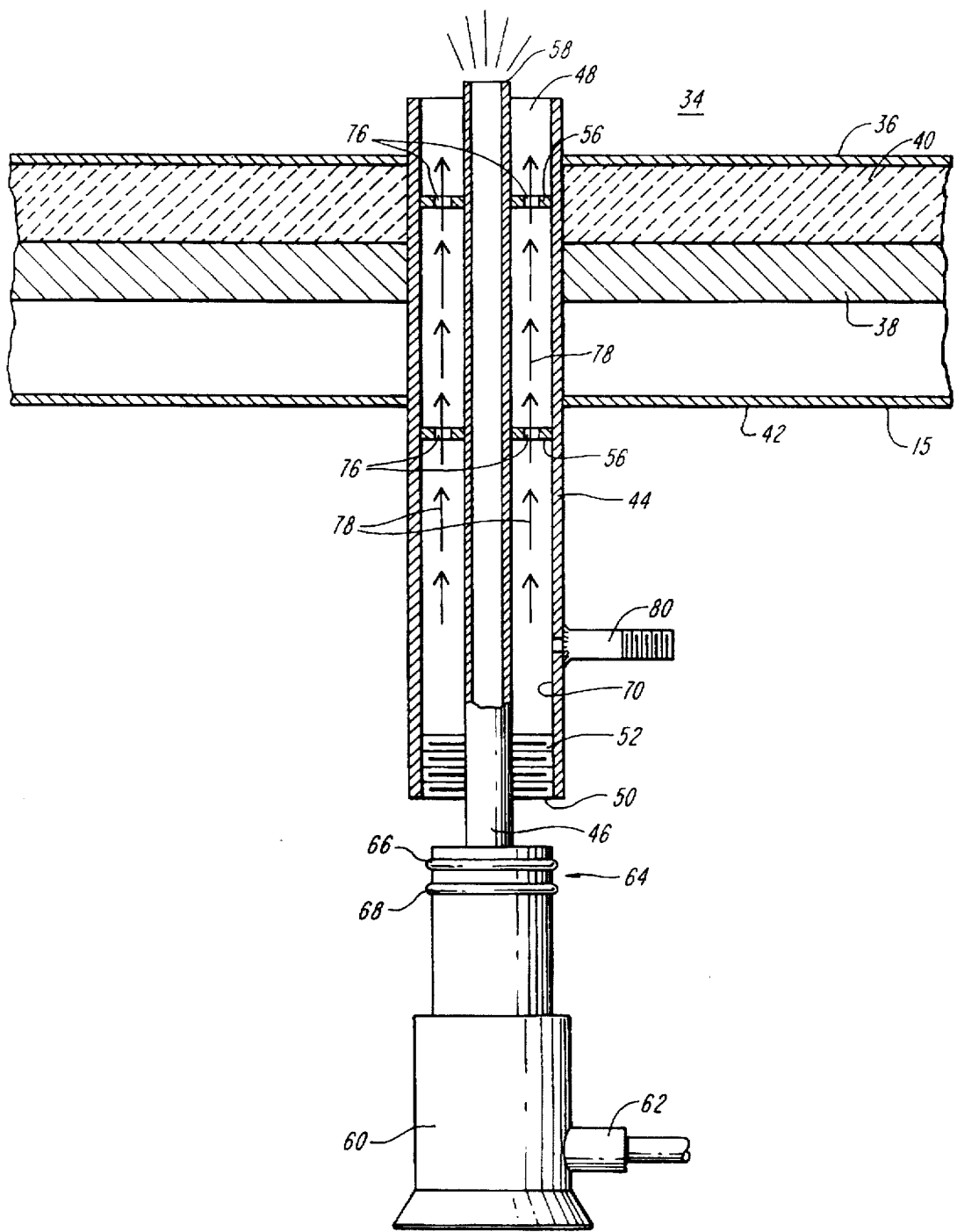
FIG. 2 is a partial cross-sectional view of the boroscope viewing assembly according to the present invention with the boroscope in place.

The furnace housing 15 is typically divided into an upper half 30 and a lower half 32. The upper half 30 is hinged or otherwise removably attached to the lower half 32 to provide access to a process chamber 34 inside the housing. Referring to FIG. 2, the furnace housing includes a process chamber liner 36 and an outer case 38 with insulation 40 provided between the liner and the outer case. An outer heat shield 42 or access panel is provided surrounding the outer case and spaced therefrom.

One or more viewing ports 44 are provided in the furnace housing 15. Each viewing port is preferably permanently affixed to the housing and a boroscope 46 is removably received therein for viewing the process chamber, as described further below. As shown, a viewing port is provided in each heating zone 16, 18, 20, 22, 24, although any desired number and location of viewing ports can be provided.

The viewing port 44 is formed from a cylindrical tube of, for example, 300 series stainless steel, which is fitted through an opening formed through the liner 36, the insulation 40, the outer case 38, and the heat shield 42. The viewing port is fastened and sealed to the housing 15 in any suitable manner. For example, annular welds on the inside and the outside of the outer case 38 can permanently affix the viewing port 44 to the outer case and provide a gas tight seal. The inner diameter of the viewing port is sized to receive the eyepiece of a boroscope in sealing engagement, as discussed further below. The viewing port has an open inner end 48 located within the process chamber 34 and an open outer end 50 located outside of the housing 15. The outer end includes an interiorly threaded section 52 to receive a sealing member 54 for use when the boroscope is removed, as described further below. The viewing port 44 may be placed in many locations and at many angles to facilitate viewing of the product in the process chamber. Typically, the port is placed near the top of the lower half 32 of the housing 15, as shown in FIG. 1.

One or more boroscope supports 56 are located inside the viewing port 44. Typically, two supports are adequate. Each boroscope support comprises a circular or disc-shaped member having a diameter sized to fit within the viewing port. The supports are fastened to the viewing port in any suitable manner, as by welding. The supports include a central opening or boroscope passthrough to removably support a boroscope 46 in alignment with the longitudinal axis of the viewing port 44 and annularly spaced therefrom. An opening of 0.25 inch in diameter is able to accommodate most boroscopes. The boroscope is inserted into the viewing port by sliding it through the passthroughs until the front 58 of the boroscope 46 is within the process chamber 34. Since the boroscope is removably retained in the viewing port, any desired boroscope can by placed in the viewing port. For example, a stationary or an articulating probe can be used. Typically, the position and angle of the viewing port is such that the board is readily viewable from the side. A right-angle viewing head on the boroscope can be used to allow the board to be seen from above.

Suitable boroscopes are readily commercially available, such as from Genesys Instruments, Inc. of Springfield, Mass. An eyepiece 60, typically supplied with the boroscope, is attached at one end thereof. A light source (not shown), typically a fiber optic source, is provided to illuminate the process chamber. Any specified wattage can be provided. The fiber optic light source is connected to the boroscope 46 through a fitting 62 on the eyepiece 60.

To seal the boroscope within the viewing port, a sealing assembly comprising a gland fitting 64 is provided on the eyepiece. The gland fitting is a low pressure seal that allows relatively easy insertion and removal. The gland fitting comprises two O-rings 66, 68 mounted in series on the outside of the eyepiece 60. Suitable annular grooves may be provided on the eyepiece to receive the O-rings if desired. The O-rings can pass beyond the interiorly threaded section 52 of the viewing port 44 to seat against the inside surface 70 of the port at a location upstream of the coolant inlet fitting while allowing insertion and removal of the boroscope. The O-rings are preferably formed of a material capable of withstanding the temperatures in the furnace, typically approximately 300° C. For example, Kalrez, compound 4079, available from du Pont, has been found to be suitable.

Figure 4:
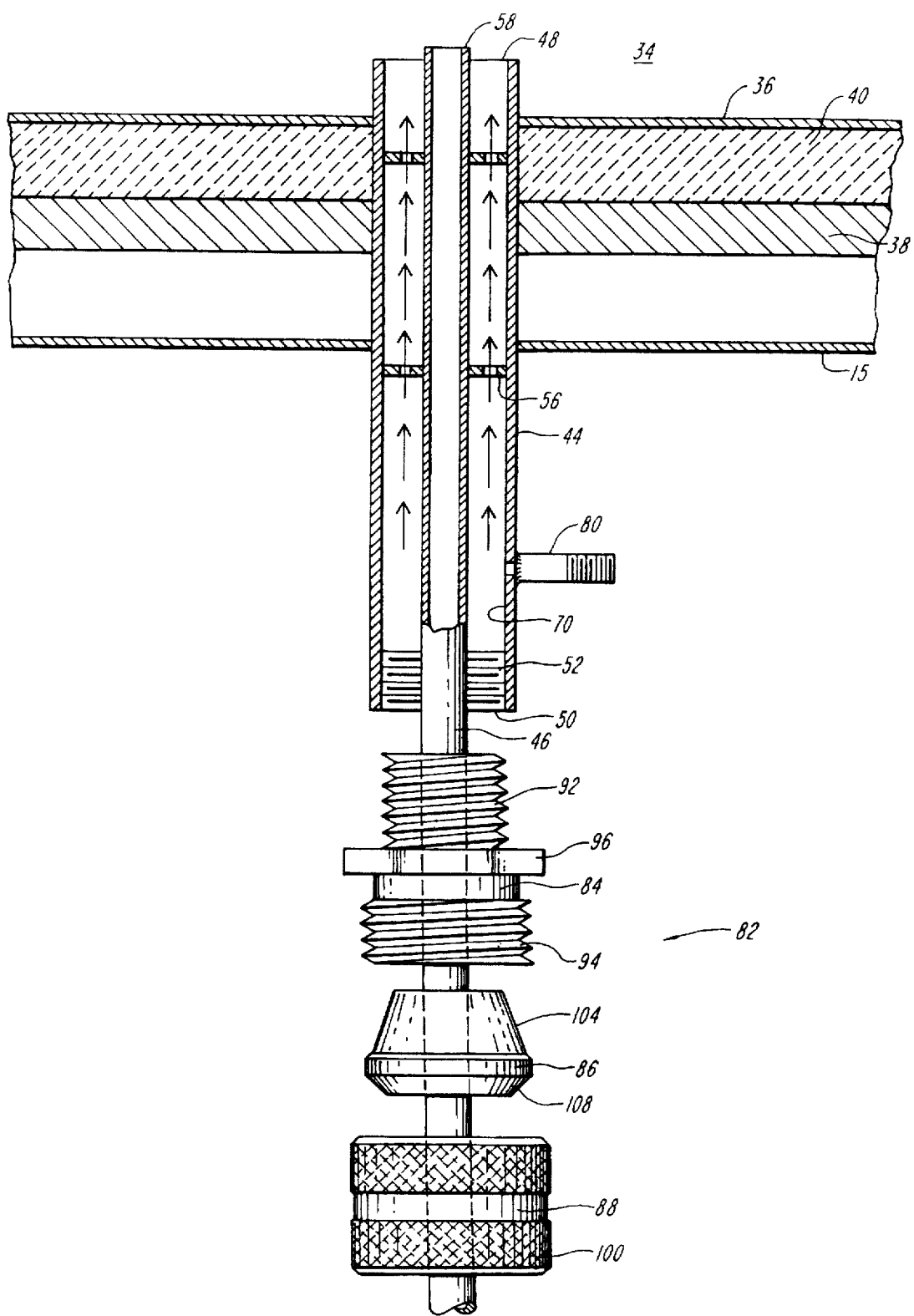
FIG. 4 is an exploded view of a further embodiment of the boroscope viewing assembly according to the present invention.

Other ways of sealing the boroscope within the viewing port can be used if desired. For example, referring to FIGS. 4 and 5, a compression sealing assembly 82 is provided having a barrel 84, a compression seal 86, and a closure member 88. An inner passage 90 of the barrel 84 is sufficiently wide to allow passage of the boroscope 46 therethrough with clearance around the boroscope. The barrel 84 has an upper exteriorly threaded section 92 and a lower exteriorly threaded section 94. The two sections are separated by an integrally formed nut 96 for gripping by a tool for tightening the threads. The upper threaded section 94 is sized to screw into the threaded section 52 of the viewing port 44. The closure member 88 includes an internal threaded section 98 which mates with the lower threaded section 94 of the barrel 84. The exterior 100 of the closure member 88 may be knurled for gripping.

Figure 5:
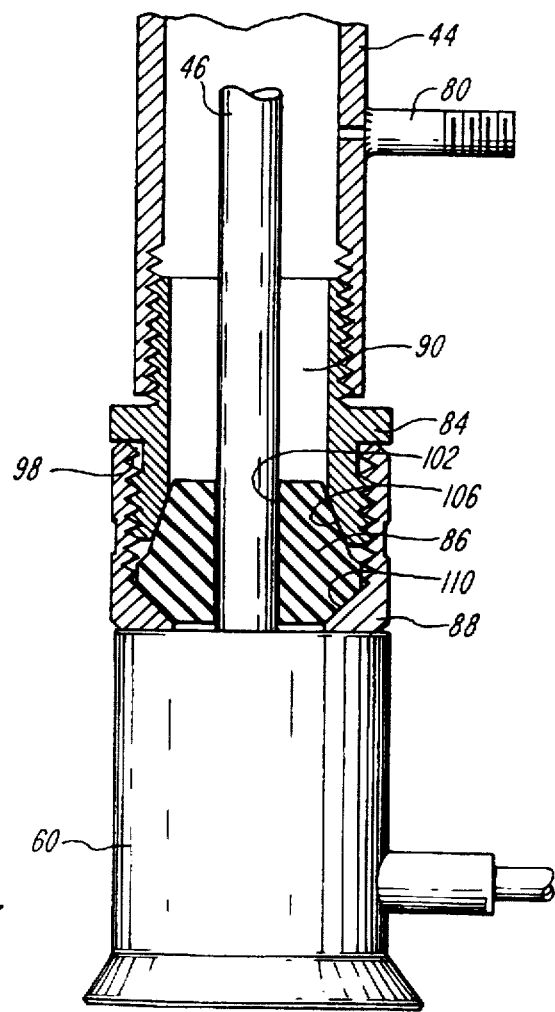
FIG. 5 is a partial cross-sectional view of the boroscope viewing assembly of FIG. 4.

A best seen in FIG. 5, the compression seal 86 has an interior passage 102 sized to fit snugly around the boroscope 46 in sealing engagement therewith. An upper exterior surface 104 of the seal is angled to seat against a correspondingly angled seat 106 of the barrel 84. A lower exterior surface 108 of the seal 86 is also angled to seat against a correspondingly angled seat 110 of the closure member 88. The compression seal is preferably formed from a suitable elastomeric material capable of withstanding the furnace temperatures.

To seal the viewing port 44, the barrel 84, compression seal 86, and closure member 88 are placed over the boroscope 46. The barrel 84 is screwed into the threaded section 52 of the viewing port 44. The closure member 88 and the barrel 84 are screwed together with the compression seal 86 seated in between. Tightening the closure member 88 to the barrel 84 compresses the compression seal 86 between the seats 106, 110, thereby forming a seal. The compression sealing assembly 82 of this embodiment is advantageous in that it is independent of the boroscope eyepiece 60.

The process chamber 34 can be viewed directly by an operator through the boroscope eyepiece 60. Alternatively, the view can be transmitted to a controller 72, including a monitor, which can be located on the furnace housing 15, as shown in FIG. 1, or remotely from the furnace in a central control area. Additionally, the view can be recorded by either controller for later viewing. For example, an entire shift or a run of one circuit board can be recorded for subsequent study. The transmission can be through a camera adapted to the eyepiece which is available from Genesys Instruments, Inc.

Figure 3:
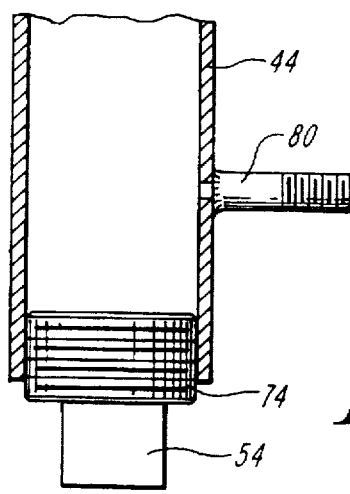
FIG. 3 is a partial cross-sectional view of the boroscope viewing assembly of FIG. 2 with the boroscope removed and a sealing member inserted.

Alternatively, the viewing port 44 can be left empty and a sealing member 54 can be fitted in the exterior end 50 to seal the process chamber. For example, a plug having exterior threads 74 is provided which mates with the interior threaded section 52 on the viewing port, as shown in FIG. 3. Other suitable sealing member configurations may be used if desired, subject to allowing passage of the gland fitting or other sealing assembly on the boroscope eyepiece.

The boroscope support or supports 56 further includes a plurality of cooling flow openings 76 therein annularly surrounding the boroscope passthrough. The cooling flow openings allow a coolant to flow along the viewing port around the boroscope as indicated by arrows 78. The boroscope support and cooling flow openings therein can have any suitable configuration which allows flow along the viewing port while supporting the boroscope concentrically within the viewing port. The coolant is introduced into the viewing port 44 through an inlet 80 in the viewing port located outside of the housing 15. In operation, the coolant flows along the viewing port 44, circumferentially surrounding the boroscope 46. From the open interior end 48 of the viewing port, the coolant flows directly into the furnace process chamber 34.

The maximum temperature rating of the glue used to retain the boroscope lenses is typically 130° C. Thus, the temperature of the boroscope barrel cannot exceed this temperature, and the coolant flow around the boroscope is able to keep the boroscope below this temperature. Additionally, the flow of coolant out of the viewing port end 48 into the process chamber 34 keeps flux vapors away from the end of the boroscope 46. Typically, a furnace running in nitrogen uses nitrogen gas flowing at 10 LPM and 5 psig as the coolant; a furnace running in an air atmosphere uses compressed air flowing at 10 LPM and 5 psig as the coolant.

The viewing ports can be retrofitted to existing furnaces if desired.

The invention is not to be limited by what has been particularly shown and described, except as indicated by the appended claims.

I claim:

1. A solder reflow convection furnace having a process chamber viewing assembly for viewing a process therein, comprising:

a furnace housing having an insulated wall, a process chamber disposed within the housing;

a tubular viewing port fixedly disposed through and sealed to the insulated wall to seal the process chamber from ambient, and having an open inner end located within the process chamber and an outer end located outside of the furnace housing;

a boroscope assembly comprising a boroscope removably mounted by a mounting member concentrically within the tubular viewing port and annularly spaced from the interior surface of the viewing port, the boroscope assembly including an eyepiece disposed at one end of the boroscope; and a sealing assembly located to provide a seal between the boroscope and the interior surface of the viewing port to seal the process chamber from ambient.

2. The solder reflow convection furnace of claim 1, wherein the sealing assembly comprises a gland fitting.

3. The solder reflow convection furnace of claim 1, wherein the eyepiece fits within the outer end of the viewing port and the sealing assembly comprises a pair of O-rings mounted on the eyepiece.

4. The solder reflow convection furnace of claim 1, wherein the sealing assembly comprises a compression seal.

5. The solder reflow convection furnace of claim 1, wherein the outer end of the tubular viewing port includes internal threads thereon and the sealing assembly comprises:

a barrel having a first set of external threads thereon sized to cooperate with the internal threads of the tubular viewing port, a second set of external threads thereon, and an internal seating surface;

a closure member having internal threads thereon sized to cooperate with the second set of external threads of the barrel, and an internal seating surface; and a compression seal disposed to seat between the respective internal seating surfaces of the barrel and the closure member for compression therebetween, the compression seal further having a passage therethrough sized to fit in sealing engagement about the boroscope.

6. The solder reflow convection furnace of claim 1, further comprising a fitting on the eyepiece for connection to a fiber optic light source.

7. The solder reflow convection furnace of claim 1, further comprising a fitting on the eyepiece for transmission of a view of the process chamber to a controller.

8. The solder reflow convection furnace of claim 1, further comprising a fitting on the viewing port outside of the furnace housing for connection to a source of a coolant gas, and wherein the boroscope mounting member includes an opening therein to allow passage of the coolant gas along the viewing port to the process chamber.

9. The solder reflow convection furnace of claim 1, wherein the outer end of the viewing port is internally threaded to receive an externally threaded sealing plug.

10. A solder reflow convection furnace having a process chamber viewing assembly for viewing a process therein, comprising:

a furnace housing having an insulated wall, a process chamber disposed within the housing;

a tubular viewing port fixedly disposed through and sealed to the insulated wall to seal the process chamber from ambient, and having an open inner end located within the process chamber and an open outer end located outside of the furnace housing;

a mounting member disposed inside said tubular viewing member to removably mount a boroscope concentrically within the tubular viewing port and annularly spaced from the interior surface of the viewing port; and a sealing member mateable with the open outer end of the tubular viewing port to seal the process chamber from ambient when the boroscope is removed from the tubular viewing port.

11. The solder reflow convection furnace of claim 10, wherein the sealing member comprises a plug having external threads thereon, and the open outer end of the tubular viewing port includes internal threads thereon sized to cooperate with the external threads of the plug.

12. The solder reflow convection furnace of claim 10, further comprising a fitting on the viewing port outside of the furnace housing for connection to a source of a coolant gas, and wherein the boroscope mounting member includes an opening therein to allow passage of the coolant gas along the viewing port to the process chamber.

13. A solder reflow convection furnace having a process chamber viewing assembly for viewing a process therein, comprising:

a furnace housing having an insulated wall, a process chamber disposed within the housing;

a tubular viewing port fixedly disposed through and sealed to the insulated wall to seal the process chamber from ambient, and having an open inner end located within the process chamber and an outer end located outside of the furnace housing;

a mounting member disposed inside said tubular viewing member;

a boroscope assembly comprising a boroscope removably mountable by the mounting member concentrically within the tubular viewing port and annularly spaced from the interior surface of the viewing port, the boroscope assembly including an eyepiece disposed at one end of the boroscope;

a sealing assembly configured to provide a seal between the boroscope and the interior surface of the viewing port to seal the process chamber from ambient; and a sealing member sized to fit within the outer end of the viewing port in sealing engagement therewith when the boroscope is removed from the viewing port.

14. The solder reflow convection furnace of claim 13, wherein the sealing member comprises a plug having external threads thereon, and the open outer end of the tubular viewing port includes internal threads thereon sized to cooperate with the external threads of the plug.

15. The solder reflow convection furnace of claim 13, wherein the sealing assembly comprises a gland fitting.

16. The solder reflow convection furnace of claim 13, wherein the sealing assembly comprises a pair of O-rings mounted on the eyepiece.

17. The solder reflow convection furnace of claim 13, wherein the sealing assembly comprises a compression seal.

18. The solder reflow convection furnace of claim 13, wherein the outer end of the tubular viewing port includes internal threads thereon and the sealing assembly comprises:
- a barrel having a first set of external threads thereon sized to cooperate with the internal threads of the tubular viewing port, a second set of external threads thereon, and an internal seating surface;
- a closure member having internal threads thereon sized to cooperate with the second set of external threads of the barrel, and an internal seating surface; and
- a compression seal disposed to seat between the respective internal seating surfaces of the barrel and the closure member for compression therebetween, the compression seal further having a passage therethrough sized to fit in sealing engagement about the boroscope.

19. The solder reflow convection furnace of claim 13, further comprising a fitting on the eyepiece for connection to a fiber optic light source.

20. The solder reflow convection furnace of claim 13, further comprising a fitting on the eyepiece for transmission of a view of the process chamber to a controller.

21. The solder reflow convection furnace of claim 13, further comprising a fitting on the viewing port outside of the furnace housing for connection to a source of a coolant gas, and wherein the boroscope mounting member includes an opening therein to allow passage of the coolant gas along the viewing port to the process chamber.

* * * * *